United States Patent [19]
Hinley et al.

[11] 3,804,655
[45] Apr. 16, 1974

[54] PIGMENTS

[75] Inventors: John James Hinley; David Graeme Milne, both of Middlesbrough; Keith Goldsbrough, Stockton-on-Tees, all of England

[73] Assignee: British Titan Limited, Billingham, Teeside, England

[22] Filed: Mar. 30, 1972

[21] Appl. No.: 239,706

[30] Foreign Application Priority Data
Apr. 7, 1971 Great Britain.................... 9036/71

[52] U.S. Cl.............. 106/300, 106/308 B, 106/309
[51] Int. Cl............................................. C09c 1/36
[58] Field of Search................ 106/300, 308 B, 309

[56] References Cited
UNITED STATES PATENTS

| | | | |
|---|---|---|---|
| 3,437,502 | 4/1969 | Werner | 106/308 B |
| 3,545,994 | 12/1970 | Lott et al. | 106/308 B |
| 3,554,777 | 1/1971 | Lederer et al. | 106/308 B |
| 3,649,322 | 3/1972 | Foss | 106/300 |

Primary Examiner—Curtis R. Davis
Attorney, Agent, or Firm—Schuyler, Birch, Swindler, McKie & Beckett

[57] ABSTRACT

Pellets of titanium dioxide, the particles of the titanium dioxide having a coating of one or more hydrous oxides in the total amount of at least 3.5 percent by weight of $TiO_2$, preferably the particles of titanium dioxide have a coating of hydrous oxide in a total amount of at least 5 percent and may be up to 35 percent by weight of $TiO_2$.

15 Claims, No Drawings

PIGMENTS

This invention relates to titanium dioxide pigments in the form of pellets.

Titanium dioxide pigment is usually sold in the form of a fine powder which can have poor flow properties and which when used can pose a considerable dust problem. It would be an advantage if the pigment could be sold in the form of pellets which are substantially dust free and which are easy to disperse to produce a substantially grit-free dispersion. It would also be an advantage if the pellets were easier to use in bulk handling procedures.

According to the present invention pelletised pigmentary titanium dioxide comprises pellets of titanium dioxide the particles of which have a coating of one or more hydrous oxides in a total amount of at least 3.5 percent by weight of $TiO_2$.

Surprisingly it has been found that when a titanium dioxide pigment coated with one or more hydrous oxides in a total amount of at least 3.5 percent by weight of $TiO_2$ is pelletised and then redispersed in an aqueous emulsion paint the film is visibly gritfree when produced by drawing the paint down on a hiding power chart which is half white and half black for example those prepared by the Morest Company Inc. of New York. Pigments having a total hydrous oxide coating of less than 3.5 percent by weight of $TiO_2$ formed into pellets and subsequently re-dispersed in an aqueous emulsion paint exhibit grits visible to the eye and are thus disadvantageous in producing a broken film surface. The presence or absence of grits is an indication of the quality of the dispersion of the pigment in the medium. It has also been found that there is no substantial loss of opacity on pelletisation and subsequent re-dispersion.

The pellets of titanium dioxide are preferably formed from titanium dioxide having a coating of hydrous oxide in a total amount of at least 5 percent on the weight of $TiO_2$ and when the pelletised pigment is to be used in aqueous emulsion paints then usually the total amount of hydrous oxide will be at least 12 percent by weight of $TiO_2$. The pellets can be formed of titanium dioxide having a hydrous oxide coating present in a large amount of up to 35 percent by weight of $TiO_2$, preferably of up to 30 percent.

Typical hydrous oxides that can be present as coating on the titanium dioxide are those of aluminium, titanium, cerium, zirconium or silicon. These hydrous oxides are hydrated oxides of variable composition and such coating hydrous oxides are well known in the field of titanium dioxide pigments. More than one hydrous oxide can be present and particularly useful pigments are those of titanium dioxide coated with hydrous oxides of silicon and aluminium in the mole ratio of silicon oxide to aluminium oxide of 1:2 to 3:1. Particularly for use in emulsion paints pellets are desired in which the coating is composed of a hydrous oxide of silicon in an amount of from 60 to 90 molar percent and a hydrous oxide of aluminium in an amount of from 40 to 10 molar percent based on the total weight in moles of the coating and in which the weight of the hydrous oxide of silicon is from 9 to 15 percent of the weight of the $TiO_2$.

The coating present on the titanium dioxide pigment prior to formation into pellets can be applied in any of the well-known ways. For instance, the coating can be applied by depositing the hydrous oxide(s) on to the pigment in an aqueous dispersion or suspension containing a water-soluble compound of the desired metal(s) by effecting a change of pH usually to a value within the pH range of 6 to 8.5 with appropriately an acid or an alkali to generate and deposit the desired hydrous oxide(s). Typical water-soluble compounds which may be used as the source of hydrous oxide are inorganic salts such as aluminium sulphate, aluminium nitrate, aluminium chloride, sodium aluminate, sodium silicate, potassium silicate, titanium sulphate, cerium sulphate and zirconium sulphate. Two or more successive coatings may be applied if desired. The hydrous oxide of silicon can be present in the form of dense silica in which precipitation is effected from an active silica solution usually at a pH above 8. An active silica solution is a freshly prepared solution of silica or preferably an in situ generated solution by adding an acid to a silicate in the presence of the pigment. If desired one or more organic coating agents can be present, such as an alkanolamine, a polyol or a polyamine e.g. triethanolamine, pentaerythritol, or trimethylolpropane.

The pigmentary titanium dioxide can be pyrogenic titanium dioxide i.e. that obtained by the vapour phase oxidation of a titanium halide usually, titanium tetrachloride in known manner or alternatively can be that obtained from the well-known "sulphate" process in which a titaniferous ore is dissolved in sulphuric acid, a hydrated titanium dioxide is precipitated and then calcined. Prior to coating with the hydrous oxide(s) the pyrogenic titanium dioxide can be coated with one or more oxides of aluminium silicon, zirconium or cerium by a vapour phase coating operation.

The titanium dioxide can be present in either the rutile or anatase form although preferably the pellets are formed from rutile titanium dioxide.

The pellets of the present invention can be formed by any suitable method and a typical method is dry trundling. One method is to use a trundler in the form of a cylinder having at one end an outlet portion in the form of a truncated cone in which the angle between the cone surface and a projection of the cylindrical wall of the trundler is not greater than the angle of slip of the pellets on the material forming the trundler. For instance, for a trundler formed of stainless steel and for pellets formed of titanium dioxide having a coating of 10 percent hydrous silica and 5 percent alumina based on $TiO_2$ the angle is not greater than 12°. The angle of slip varies with the particular pigment being pelletised and is easily determined. The use of such a trundler reduces the tendency to form grits during pelletisation by preventing excessive recirculation within the bed of pellets in the trundler. Suitable apparatus for effecting pelletising is described and claimed in our co-pending British Application No. 09034/71.

Preferably the titanium dioxide to be pelletised is introduced at a point located at least one-sixth along the length of the trundler or three feet along which ever is the least. Also it is preferred that the titanium dioxide to be pelletised should have a bulk density of at least 0.34 gm/cc and be passed through a sieve prior to pelletising. The sieve used should have a British Standard mesh number of not less than 5 and less than 44 but preferably from 7 mesh to 44. The purpose of sieving is not to remove undersized or oversized particles but to influence the ease of pelletisation. A method for the pelletising of pigment is described and claimed in our co-pending British Application Nos. 09035/71, 56718/71.

The pellets of the present invention are of particular use in the manufacture of aqueous emulsion paints although they can be used in other types of paint. The pigment is dispersed easily in the paint base. A typical emulsion mill base formulation employed in the paint industry consists of a coalescing agent, a dispersing agent, fungicide, thickners, pigment and water. Due to the ease of incorporation of the pigment pellets and the increased bulk density i.e. from 0.35 to 0.6 grammes/ml, it is possible to use less water (for instance 10 to 20 percent less) and to use an increased volume of pigment pellets. This gives a higher production rate per batch.

The pellets can also be used in the manufacture of plastics and rubbers and for the manufacture of paper coatings. The pellets can also be used in the preparation of synthetic fibres.

The pellets have a free-flowing nature and are generally dust free. Usually the pellets will have a size of 5 mesh to 72 mesh according to British Standard Specification No. 410, (1943). They are ideally suited for use in bulk handling procedures and for automatic weighing and feeding to mixing and other vessels.

The invention is illustrated in the following examples.

In the following examples the titanium dioxide pigments that were used were coated by the following technique.

To an aqueous slurry of rutile titanium dioxide which had been milled, containing 180 to 200 grams per litre $TiO_2$ and sodium silicate as a dispersant in an amount equivalent to 0.2% $SiO_2$ on $TiO_2$ and which was heated to 45°C there was added an aqueous solution of titanyl sulphate at a rate of 4 mls. per minute as required. The titanyl sulphate solution contained the equivalent of 275 grammes per litre $TiO_2$. The addition of titanyl sulphate was only made if the coating was to contain a hydrous oxide of titanium.

To the stirred slurry there was added solid sodium aluminate at a rate of about 5 grams per minute until the desired total amount had been added. The slurry was then stirred for 30 minutes.

To the slurry there was then added sodium silicate solution containing the equivalent of 100 grams per litre $SiO_2$ at a rate of about 16 mls. per minute until the desired amount had been added, after which time the slurry was stirred for 20 minutes.

Finally sulphuric acid (10% $H_2SO_4$) was added to adjust the pH of the slurry to 4.8 ± 0.2 and the slurry was stirred for 30 minutes.

The coated titanium dioxide so obtained was filtered from the slurry, washed, repulped and filtered again. The coated pigment so obtained was dried at 110°C for about 12 hours then it was crushed and fluid energy milled.

Prior to pelletisation the pigments were passed through a sieve having a British Standard Mesh number of 10 and then 300 grams of the pigment which had been passed through the sieve was placed in a 720 ml. jar and rotated for 30 minutes at 110 r.p.m. on a set of rollers.

The pellets of pigment so obtained were then tested for their ease of dispersibility in aqueous emulsion paints by the following technique. A composition having the following constitution was prepared by mixing the following ingredients.

| Material | Grams |
|---|---|
| Water | 3164 |
| Sodium hexametaphosphate solution (5%) | 1120 |
| Tergitol (5%) | 1000 |
| Thickner (AP4400 2½% solution | 2856 |
| Butyl cellusolve acetate | 98 |
| Ammomium hydroxide solution (10%) | 140 |
| Fungicide (Nuodex) | 14 |

A mill base was then prepared by hand mixing 122 grams of the above composition with 61 grams of talc and 75 grams of the pelletised pigment under test. The mill base was then mixed in a high speed mixer revolving at 1,200 r.p.m. for 5 minutes to disperse the constitutant pigment particles of the pellets. A polymeric paint binder in an amount of 77.5 grams was added to 207.5 grams of the so prepared paint mill base. The particular polymeric paint binder used was a polyvinyl acetate/acrylic copolymer obtainable under the name of Polymul 995.

The so-prepared aqueous emulsion paint was then tested by prepared draw-downs on a Morest Chart Form 07P prepared with a wire wound applicator giving either 36 micron or 60 micron wet film thickness. The nature of the draw-downs were then observed and the presence of freedom from grits was noted.

Example 1

A series of coated titanium dioxide pigments was prepared in which the coatings contained hydrous alumina and hydrous silica in the amounts specified below and then pelletised and subsequently tested for their ease of dispersibility as described above. The presence or absence of grits visible to the eye was noted and shown below.

| Composition of Coating | | Presence or Absence of Grits |
|---|---|---|
| % hydrous Alumina | % hydrous Silica | |
| 2% | 1% | Present |
| 1% | 2% | Present |
| 0.6% | 2.4% | Present |

These results show that at a total coating lever of 3 percent hydrous oxide on $TiO_2$ grits were present in the redispersed titanium dioxide in an aqueous paint.

Example 2

The procedure described in Example 1 was repeated but for different coating levels, the results of the tests are as follow:

| Composition of Coating | | Presence or Absence of Grits |
|---|---|---|
| % hydrous Alumina | % hydrous Silica | |
| 3.33% | 1.67% | Absent |
| 2.5% | 2.5% | Absent |
| 1.25% | 3.75% | Absent |

This Example illustrated that at a total coating level of 5 percent hydrous oxide on $TiO_2$ the pelletised pigment can be redispersed without the presence of grits.

Example 3

The procedure described in Example 1 was repeated except that the coating levels were substantially increased and the results are shown below.

| Composition of Coating | | Presence or Absence of Grits |
|---|---|---|
| % hydrous Alumina | % hydrous Silica | |
| 10% | 5% | Absent |
| 8% | 7% | Absent |
| 6% | 9% | Absent |
| 5% | 10% | Absent |
| 3.75% | 11.25% | Absent |

This Example shows that pigment having a substantial coating can be dispersed without the formation of grits after pelletisation.

Example 4

The experiment described in Example 1 was repeated except that the coating also contained an amount of a hydrous oxide of titanium in an amount of 1 percent on $TiO_2$. The pellets formed were tested as described previously and the proportions of hydrous oxide of alumina and hydrous oxide of silica in addition to the 1 percent hydrous $TiO_2$ were as in the following table.

| Composition of Coating | | Presence or Absence of Grits |
|---|---|---|
| % hydrous Alumina | % hydrous Silica | |
| 2% | 1% | Absent |
| 1% | 2% | Absent |
| 0.6% | 2.4% | Absent |

The above results clearly show that at total coating level of 4 percent hydrous oxide on $TiO_2$, pellets produced from titanium dioxide can be redispersed without grits being present.

Example 5

The procedure described in Example 2 was repeated except that the coating additionally contained a hydrous oxide of titanium in an amount of 1 percent expressed as $TiO_2$ on $TiO_2$.

The results of the test performed on the pellets are shown below.

| Composition of Coating | | Presence or Absence of Grits |
|---|---|---|
| % hydrous Alumina | % hydrous Silica | |
| 3.33% | 1.67% | Absent |
| 2.5% | 2.5% | Absent |
| 1.25% | 3.75% | Absent |

Example 6

The procedure described in Example 3 was repeated except that a hydrous oxide of titanium was present in an amount of 1 percent expressed as $TiO_2$ on $TiO_2$.

The results of the test performed on the pelletised product are given below.

| Composition of Coating | | Presence or Absence of Grits |
|---|---|---|
| % hydrous Alumina | % hydrous Silica | |
| 10% | 5% | Absent |
| 8% | 7% | Absent |
| 6% | 9% | Absent |
| 5% | 10% | Absent |
| 3.75% | 11.25% | Absent |

In all the above tests the quality of the pelletised pigment was judged in comparison with a non-pelletised pigment having the same coating as applied above. Similar experimental results are obtained when the coated pigments are tested in oleoresinous paints but in this case, after the appropriate paint mill base has been mixed in the high speed mixer and addition of the resin it has been found advisable to further mill the paint in a ball-mill or other similar type of apparatus for a period of up to 2 hours, to achieve equivalent dispersion when compared with a non-pelletised pigment of the same constitution.

Similar experimental results to those obtained in Experiments 1 to 6 are obtained if the pigment is fluid energy milled after coating in the presence of an organic compound such as pentaerythritol, trimethylolpropylene or triethanolamine.

What is claimed is:

1. Pelletised pigmentary titanium dioxide comprising pellets of titanium dioxide the particles of which have a coating of at least one hydrous oxide in a total amount of at least 3.5 percent by weight of $TiO_2$.

2. Pelletised pigmentary titanium dioxide according to claim 1 in which the coating of at least one hydrous oxide is present in a total amount of at least 5 percent by weight of $TiO_2$.

3. Pelletised pigmentary titanium dioxide according to claim 1 in which the coating of at least one hydrous oxide is present in an amount of at least 12 percent by weight of $TiO_2$.

4. Pelletised pigmentary titanium dioxide according to claim 1 in which the coating of hydrous oxide is present in a total amount of up to 35 percent by weight of $TiO_2$.

5. Pelletised pigmentary titanium dioxide according to claim 1 in which the pellets have a size in the range 5 mesh to 72 mesh according to British Standard Specification No. 410,(1943).

6. Pelletised pigmentary titanium dioxide according to claim 1 in which the hydrous oxide is selected from the class of hydrous oxides of a metal consisting of aluminium, titanium, cerium, zirconium and silicon.

7. Pelletised pigmentary titanium dioxide according to claim 6 in which the coating contains a hydrous oxide of silicon and a hydrous oxide of aluminium in a mole ratio of $SiO_2:Al_2O_3$ of from 1:2 to 3:1.

8. Pelletised pigmentary titanium dioxide according to claim 1 in which the coating is composed of a hydrous oxide of silicon in an amount of from 60 to 90 molar percent and a hydrous oxide of aluminium in an amount of from 40 to 10 molar percent based on the total weight in moles of the coating, and in which the weight of the hydrous oxide of silicon is from 9 to 15 percent of the weight of the $TiO_2$.

9. Pelletised pigmentary titanium dioxide according to claim 1 in which the titanium dioxide is that formed by a method comprising the dissolution of a titaniferous ore by sulphuric acid, precipitation of a hydrated form of titanium oxide and its subsequent calcination.

10. Pelletised pigmentary titanium dioxide according to claim 1 in which the titanium dioxide is pyrogenic titanium dioxide produced by the vapour phase oxidation of a titanium halide.

11. Pelletised pigmentary titanium dioxide according to claim 1 in which the titanium dioxide is in the rutile form.

12. A method for the production of pelletised pigmentary titanium dioxide which comprises trundling the pigment to be pelletised having a coating of at least one hydrous oxide on the particles in a total amount of at least 3.5 percent by weight of $TiO_2$ until the pellets are formed.

13. A method for the production of pelletised pigmentary titanium dioxide which comprises forming an aqueous suspension of titanium dioxide containing at least one water-soluble hydrolysable compound of the class of metals consisting of aluminium, titanium, cerium, zirconium and silicon in an amount such that the total oxide equivalent is at least 3.5 percent by weight based on $TiO_2$, changing the pH of the mixture to precipitate on the particles of titanium dioxide at least one hydrous oxide in a total amount of at least 3.5 percent by weight of $TiO_2$, recovering the so coated titanium dioxide and trundling the coated pigment until a pelletised product is obtained.

14. A method according to claim 13 in which the water-soluble hydrolysable compound of aluminium, titanium, cerium, zirconium or silicon is an inorganic salt thereof.

15. Pelletised pigmentary titanium dioxide comprising pellets of titanium dioxide, said pellets consisting essentially of particles of titanium dioxide which particles have a coating of at least one hydrous oxide in a total amount of at least 3.5 percent by weight of $TiO_2$.

* * * * *